US011263715B2

(12) United States Patent
Ananthapur Bache et al.

(10) Patent No.: US 11,263,715 B2
(45) Date of Patent: Mar. 1, 2022

(54) USER OPERATIONAL SPACE CONTEXT MAP-ACTUATED RISK PREDICTION AND REDUCTION COGNITIVE SUIT

(71) Applicant: International Business Machines Corporation, Armonk, NY (US)

(72) Inventors: Vijay Kumar Ananthapur Bache, Bangalore (IN); Vijay Ekambaram, Chennai (IN); Srikanth K. Murali, Bangalore (IN); Padmanabha Venkatagiri Shesadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 15/849,016

(22) Filed: Dec. 20, 2017

(65) Prior Publication Data

US 2019/0188815 A1   Jun. 20, 2019

(51) Int. Cl.
| | |
|---|---|
| *G06Q 50/26* | (2012.01) |
| *G06N 5/02* | (2006.01) |
| *G06K 9/62* | (2022.01) |
| *G06K 9/00* | (2022.01) |
| *A41D 13/02* | (2006.01) |
| *A41D 13/018* | (2006.01) |
| *A41D 1/00* | (2018.01) |

(Continued)

(52) U.S. Cl.
CPC .......... *G06Q 50/265* (2013.01); *A41D 1/002* (2013.01); *A41D 13/018* (2013.01); *A41D 13/02* (2013.01); *G06K 9/00771* (2013.01); *G06K 9/6215* (2013.01); *G06K 9/6259* (2013.01); *G06N 5/02* (2013.01); *G06T 17/05* (2013.01); *G06T 19/00* (2013.01); *A41D 2600/20* (2013.01); *G06T 2219/004* (2013.01)

(58) Field of Classification Search
CPC combination set(s) only.
See application file for complete search history.

(56) References Cited

U.S. PATENT DOCUMENTS

| | | |
|---|---|---|
| 6,687,523 B1 | 2/2004 | Jayaraman et al. |
| 7,519,192 B1 | 4/2009 | Laycock et al. |
| 9,282,893 B2 | 3/2016 | Longinotti-Buitoni et al. |

(Continued)

OTHER PUBLICATIONS

Fukaya et al. Protection against Impact with the Ground Using Wearable Airbags, Nov. 19, 2007 (Year: 2007).*

(Continued)

*Primary Examiner* — Hilina K Demeter
(74) *Attorney, Agent, or Firm* — Yee & Associates, P.C.

(57) ABSTRACT

Generating a risk and constraint labeled context map of an operational space is provided. The risk and constraint labeled context map of the operational space corresponding to a user of a cognitive suit is generated to drive the cognitive suit contextually using three-dimension reconstruction, virtual reality, and semi-supervised learning. Labeled risks and constraints in the risk and constraint labeled context map are associated with cognitive suit actuation events to deploy a set of mitigation strategies to address the labeled risks and constraints. An apparatus embedded in the cognitive suit is actuated to deploy the set of mitigation strategies in response to sensing a labeled risk or labeled constraint proximate to the user along a trajectory of the user in the operational space.

19 Claims, 6 Drawing Sheets

(51) Int. Cl.
G06T 17/05 (2011.01)
G06T 19/00 (2011.01)

(56) References Cited

U.S. PATENT DOCUMENTS

| 9,754,167 B1* | 9/2017 | Holz ................. G06K 9/00355 |
| 2012/0146784 A1 | 6/2012 | Hines et al. |
| 2016/0278444 A1 | 9/2016 | Jordan et al. |
| 2017/0318360 A1* | 11/2017 | Tran ....................... B33Y 80/00 |

OTHER PUBLICATIONS

Brinks et al., "Textiles for protection at the workplace; developments in textiles for a safer working environment", Saxion Research Centre for Design and Technology, 2011, 23 pages.
Poupyrev et al., "Project Jacquard: Interactive Digital Textiles at Scale", Proceedings of the 2016 CHI Conference on Human Factors in Computing Systems, 2016, 12 pages.
Castano et al., "Smart fabric sensors and e-textile technologies: a review", University of Maryland Department of Aerospace Engineering, Apr. 1, 2014, 28 pages.
Buechley et al., "The LilyPad Arduino: using computational textiles to investigate engagement, aesthetics, and diversity in computer science education", Proceedings of the SIGCHI Conference on Human Factors in Computing Systems, Apr. 2008, 10 pages.
"E-Textiles-In-A-Box", National Center for Women & Information Technology, accessed Jan. 3, 2018, 122 pages. http://www.ncwit.org/sites/default/files/resources/etextiles_box.pdf.
Buechley et al., "Sew Electric", H Publishing, 2014, 3 pages. Abstract Only.
Weigel et al., "SkinMarks: Enabling Interactions on Body Landmarks Using Conformal Skin Electronics", Proceedings of the CHI 2017 Conference on Haptics on Skin, May 2017, 11 pages.
Etherington, "Biostamp temporary tattoo electronic circuits by MC10", Dezeen, Mar. 28, 2013, 3 pages, https://www.dezeen.com/2013/03/28/biostamp-temporary-tattoo-wearable-electronic-circuits-john-rogers-mc10/.
Juhlin, "Digitizing Fashion: Software for wearable devices", Interactions Magazine, vol. 22, Issue 3, May 2015, pp. 44-47.
"Intimate Technology", XS Labs, accessed Jan. 3, 2018, 2 pages. http://www.xslabs.net/theory.html.
"Smart Clothes: Textiles That Track Your Health", Science Daily, Mar. 31, 2008, 6 pages. www.sciencedaily.com/releases/2008/03/080329121141.htm.
New smart textile is the muscle behind next generation devices, Science Daily, Oct. 11, 2016, 5 pages. www.sciencedaily.com/releases/2016/10/161011135339.htm.
"Smart clothing of the future will automatically adjust itself according to the wearer's actual needs", Science Daily, Mar. 9, 2016, 4 pages, www.sciencedaily.com/releases/2016/03/160309083254.htm.
Hiyama et al., "BabyBumber: protector/communication wearable device for pregnant women", Adjunct Proceedings of the 2015 AMC International Joint Conference on Pervasive and Ubiquitous Computing and Proceedings of the 2015 AMC International Symposium on Wearable Computers, Sep. 2015, pp. 173-176. Abstract Only. https://dl.acm.org/citation.cfm?id=2800907.
Fukaya et al., "Protection against impact with the ground using wearable airbags" Industrial Health, Issue 46, 2008, pp. 59-65.

Hawes, StimElation: The FIRST Prenatal Smart Wearable, Indiegogo Inc., accessed Jan. 3, 2018, 5 pages. https://www.indiegogo.com/projects/stimelation-the-first-prenatal-smart-wearable-4#/.
Roinesalo et al., "Solar shirt: design of an environmental awareness wearable", Proceedings of the 2016 ACM International Joint Conference on Pervasive and Ubiquitous Computing, Sep. 2016, pp. 495-499. Abstract Only. https://dl.acm.org/citation.cfm?id=2971350.
Schneegass et al., "GestureSleeve: using touch sensitive fabrics for gestural input on the forearm for controlling smartwatches", Proceedings of the 2016 ACM International Symposium on Wearable Computers, Sep. 2016, 8 pages.
Hughes et al., "Intelligent RF-Based Gesture Input Devices Implemented Using e-Textiles", Sensors, vol. 17, Issue 2, Jan. 24, 2017, 20 pages. http://www.mdpi.com/1424-8220/17/2/219/htm.
Borg, "Athos Smarth Clothes for Peak Performance Fitness", Urban Wearables, Jun. 11, 2015, 7 pages, http://urbanwearables.technology/athos-smart-clothes-for-peak-performance-fitness/.
Yang et al., "Effect of garment design on piezoelectricity harvesting from joint movement", Smart Materials and Structures, Feb. 22, 2016, 15 pages.
Zhong et al., "Fiber-based generator for wearable electronics and mobile medication", ACS Nano, Issue 8, vol. 6, 2014, 8 pages.
"Smart Anti-snore Pillow", Smart Anti-Snore Pillow, 2008, 2 pages. http://mysmartpillow.com/.
Lavars, "Luna smart mattress cover takes Internet of Things to bed", Gizmag PTY Ltd., Jan. 27, 2015, 6 pages. http://newatlas.com/luna-smart-mattress-cover/35813/.
Lim, "Smart underwear for diabetic patients", Journal of Textile and Apparel, Technology and Management, vol. 6, Issue 1, 2009, 11 pages.
"T.Ware", National University of Singapore, accessed Jan. 4, 2018, 6 pages. http://enterprise.nus.edu.sg/success-stories/detail/22.
Poon, "A Color-Changing Shirt That Detects Air Pollution", CityLab.com, Jul. 27, 2016, 4 pages. http://www.citylab.com/navigator/2016/07/a-color-changing-shirt-that-detects-air-pollution/493205/.
Brown, "Catalytic Clothing—Purifying Air Goes Trendy", Scientific American, Mar. 21, 2012, 16 pages. https://blogs.scientificamerican.com/guest-blog/catalytic-clothing-purifying-air-goes-trendy/.
"Robotic Sock Technology for Prevention of Deep Vein Thrombosis and Joint Contracture", IPI Singapore, accessed Jan. 4, 2018, 2 pages. https://www.ipi-singapore.org/technology-offers/robotic-sock-technology-prevention-deep-vein-thrombosis-and-joint-contracture.
"Intelligent blind control", Loxone Electronics GmbH, accessed Jan. 4, 2018, 6 pages. https://www.loxone.com/enen/smart-home/blinds/.
"Slide: Make Your Existing Curtains Smart!", Kickstarter PBC, 6 pages. https://www.kickstarter.com/projects/41829059/slide-make-your-existing-curtains-smart.
Maslakovic, "Wearables that monitor your posture", Gadgets and Wearables, Sep. 18, 2017, 9 pages. http://gadgetsandwearables.com/2017/03/25/posture-wearables/.
Alahi et al., "Social LTSM: Human Trajectory Prediction in Crowded Spaces", IEEE Conference on Computer Vision and Pattern Recognition (CVPR), Jun. 2016, pp. 961-971.
Syduzzaman et al., "Smart Textiles and Nano-Technology: A General Overview", Journal of Textile Science and Engineering, vol. 5, Issue 1, 2015, 7 pages.

* cited by examiner

USER OPERATIONAL SPACE CONTEXT MAP-ACTUATED RISK PREDICTION AND REDUCTION COGNITIVE SUIT

BACKGROUND

1. Field

The disclosure relates generally to smart garments and more specifically to generating a risk and constraint labeled context map of an operational space corresponding to a user of a risk prediction and reduction cognitive suit to drive an inflatable/deflatable actuation apparatus embedded in the risk prediction and reduction cognitive suit contextually using three-dimension reconstruction of the operational space, virtual reality, semi-supervised learning, and embedded sensors.

2. Description of the Related Art

Environments where workers are operating in high-risk spaces, such as, for example, shop floors and factories, which have in situ risks, such as sharp edges, hot surfaces, and the like, and also have narrow spaces, such as piping or ventilation runs, that require workers to wear protective garments. However, these protective garments should not incumber workers from performing their respective jobs. Smart garments and smart textiles are comprised of fabrics that enable digital components, such as, for example, batteries, lights, data processors, sensors, and other electronics to be embedded in them. Existing smart garments and textiles may use the sensors to detect a user's condition or detect the type of environment the user is operating within.

SUMMARY

According to one illustrative embodiment, a computer-implemented method for generating a risk and constraint labeled context map of an operational space is provided. A data processing system generates the risk and constraint labeled context map of the operational space corresponding to a user of a cognitive suit to drive the cognitive suit contextually using three-dimension reconstruction, virtual reality, and semi-supervised learning. The data processing system associates labeled risks and constraints in the risk and constraint labeled context map with cognitive suit actuation events to deploy a set of mitigation strategies to address the labeled risks and constraints. The data processing system actuates an apparatus embedded in the cognitive suit to deploy the set of mitigation strategies in response to sensing a labeled risk or labeled constraint proximate to the user along a trajectory of the user in the operational space. According to other illustrative embodiments, a computer system and computer program product for generating a risk and constraint labeled context map of an operational space are provided.

DETAILED DESCRIPTION

Figure 1:
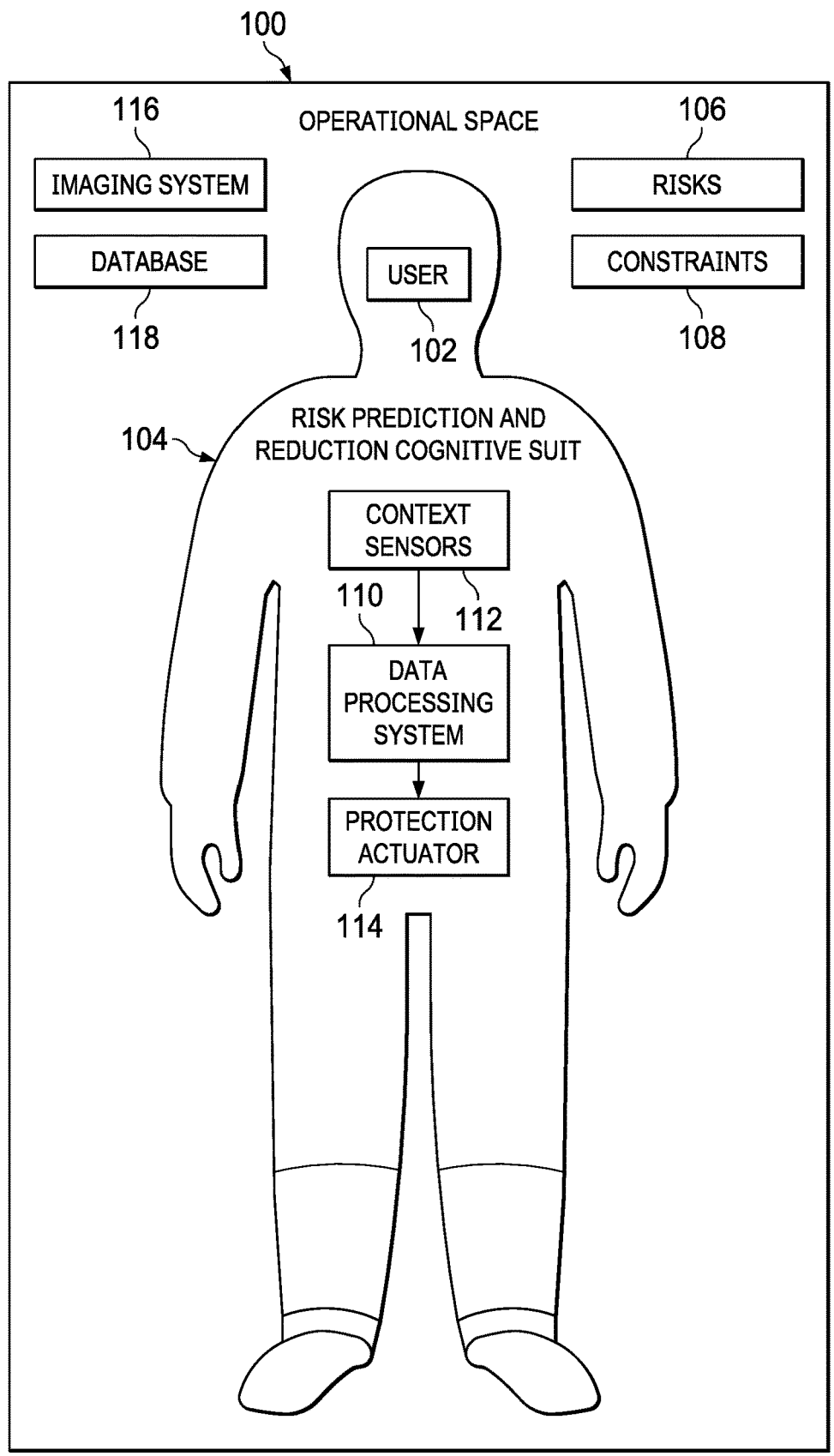
FIG. 1 is a pictorial representation of an operational space in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
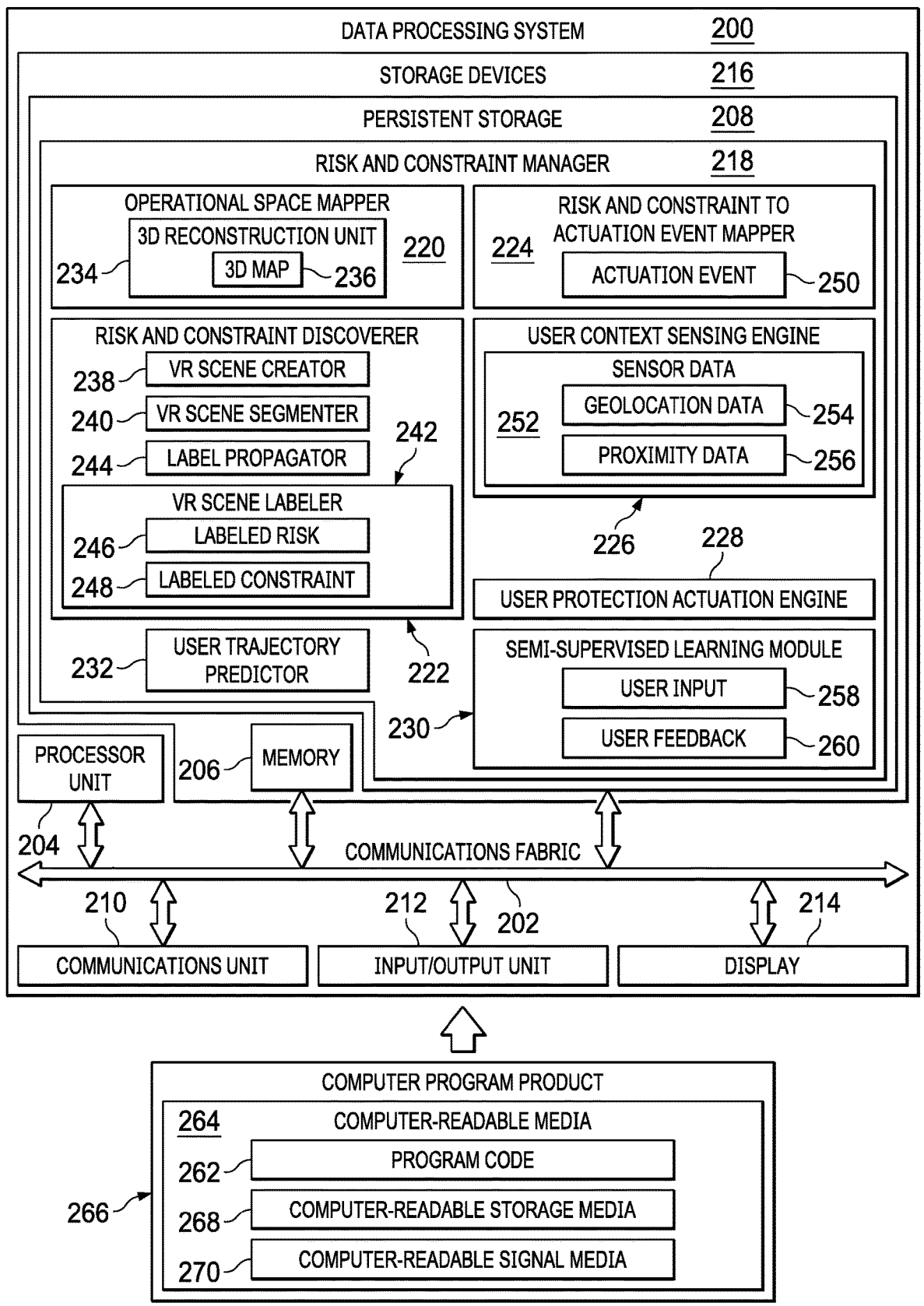
FIG. 2 is a diagram of a data processing system in which illustrative embodiments may be implemented.
Figure 3:
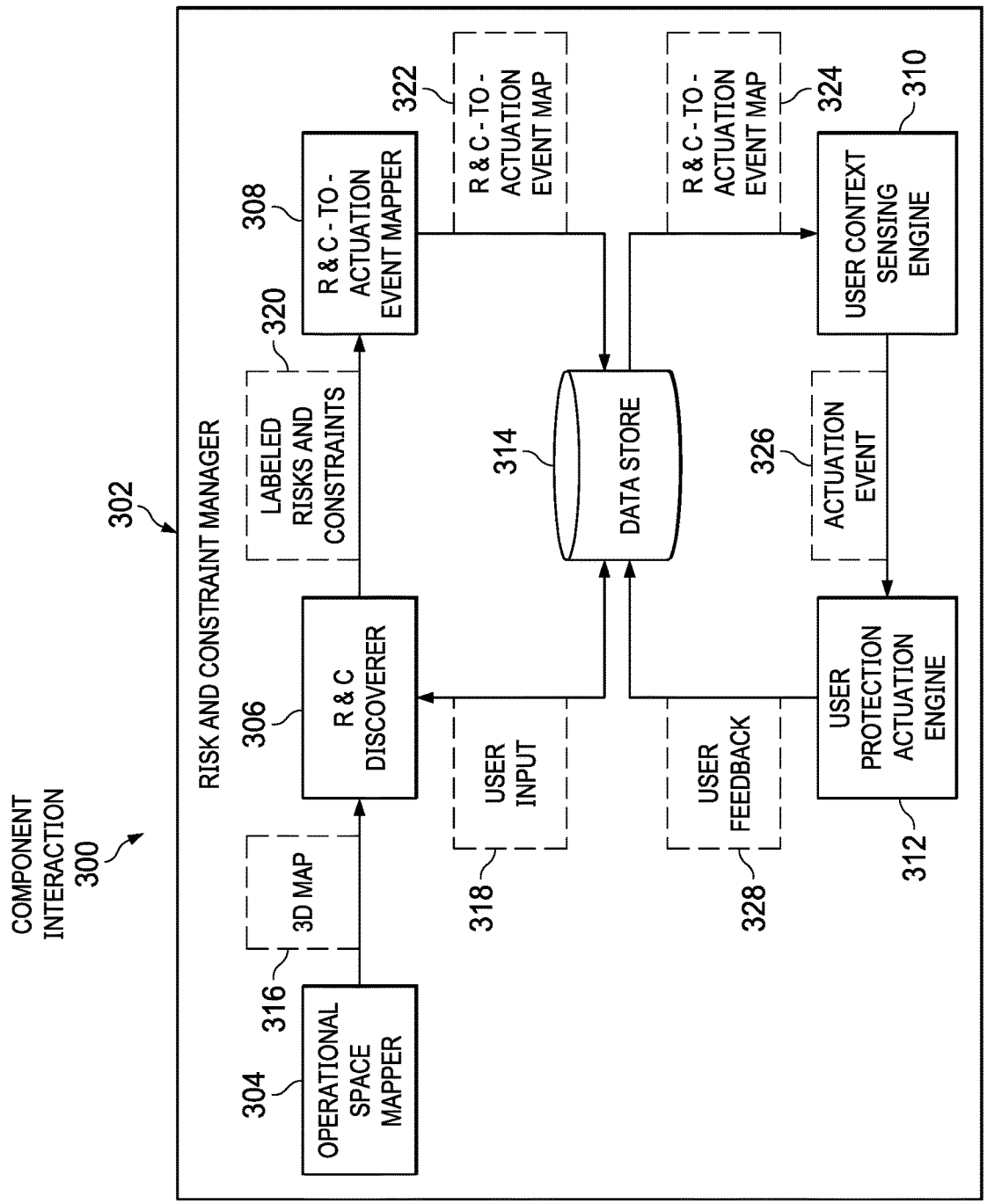
FIG. 3 is a diagram illustrating an example of risk and constraint manager component interaction in accordance with an illustrative embodiment.

With reference now to the figures, and in particular, with reference to FIGS. 1-3, diagrams of environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of an operational space in which illustrative embodiments may be implemented. Illustrative embodiments of the present invention recognize that currently no mechanism exists where smart garments and textiles are regulated by objects and conditions within the user's operational space as the user moves about the operational space.

Operational space 100 represents a defined area, such as a work area having identifiable boundaries, corresponding to user 102. The defined work area may be, for example, all or a portion of a shop or factory floor where user 102 operates or performs assigned job duties, which require user 102 to wear risk prediction and reduction cognitive suit 104. Risk prediction and reduction cognitive suit 104 is designed to protect user 102 from risks 106 and constraints 108 located in operational space 100.

Risks 106 represent risks of physical injury to user 102. Risks 106 may include, for example, molten materials or moving objects in proximity to user 102. Constraints 108 represent physical restrictions with regard to a size of user 102. Constraints 108 may include, for example, tight crawl spaces along steam pipe runs or narrow electrical access hatches. Risk prediction and reduction cognitive suit 104 may be made of a flexible fabric or material, such as, for example, a smart garment or smart textile, embedded with data processing system 110, context sensors 112, and protection actuators 114.

In this example, risk prediction and reduction cognitive suit 104 is illustrated as a full body cognitive suit. However, it should be noted that risk prediction and reduction cognitive suit 104 is only meant as an example and not as a limitation on different illustrative embodiments. For example, risk prediction and reduction cognitive suit 104 may cover only a portion of user 102's body, such as upper body only, lower body only, forearms and hands only, legs and feet only, hands only, feet only, head only, torso only, and the like. In addition, it should be noted that operational space 100 may include any number of additional users wearing risk prediction and reduction cognitive suits not shown.

Data processing system 110 represents any type of device that includes at least a processor, memory, and storage device, such as a computer. In addition, data processing system 110 may represent multiple data processing systems embedded in risk prediction and reduction cognitive suit 104. Program code located in data processing system 110 may be stored on the storage device.

Context sensors 112 represent a set of sensors that may include, for example, geographical position sensors and object proximity detectors, which detect a context of user 102 within operational space 100. Protection actuator 114 represents one or more actuators that are responsible for activating or triggering a protective mechanism, such as an inflatable/deflatable apparatus, which is embedded in risk prediction and reduction cognitive suit 104 to mitigate risks 106 and constraints 108 to user 102. Context sensors 112 and protection actuator 114 are coupled to data processing system 110 via wire communication links and/or wireless communication links.

Also in this example, operational space 100 includes imaging system 116 and database 118. Imaging system 116 represents a set of imaging devices, such as still picture and/or video cameras, located at different positions within operational space 100. Data processing system 110 may utilize image data received from imaging system 116 to generate three-dimensional maps of operational space 100. Further, data processing system 110 may retrieve information, such as floor plans of operational space 100, job duties of user 102, and the like, from database 118. Imaging system 116 and database 118 may be coupled to data processing system 110 via a network, such as, for example, a local area network. However, it should be noted that database 118 may be included in data processing system 110 in an alternative illustrative embodiment.

With reference now to FIG. 2, a diagram of a data processing system is depicted in accordance with an illustrative embodiment. Data processing system 200 is an example of a computer in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, and the like.

In this example, persistent storage 208 stores risk and constraint manager 218. Risk and constraint manager 218 automatically generates a three-dimensional risk and constraint labeled context map of an operational space corresponding to a user of a risk prediction and reduction cognitive suit to drive an inflatable/deflatable actuation apparatus embedded in the risk prediction and reduction cognitive suit contextually using three-dimension reconstruction of the operational space, virtual reality, semi-supervised learning, and embedded sensors. The operational space corresponding to the user of the risk prediction and reduction cognitive suit may be, for example, operational space 100 corresponding to user 102 of risk prediction and reduction cognitive suit 104 in FIG. 1. The inflatable/deflatable actuation apparatus embedded in the risk predic- tion and reduction cognitive suit may be, for example, protection actuator 114 in FIG. 1. The embedded sensors may be, for example, context sensors 112 in FIG. 1.

It should be noted that even though risk and constraint manager 218 is illustrated as residing in persistent storage 208, in an alternative illustrative embodiment risk and constraint manager 218 may be a separate component of data processing system 200. For example, risk and constraint manager 218 may be a hardware component coupled to communication fabric 202 or a combination of hardware and software components. In another alternative illustrative embodiment, a first set of components of risk and constraint manager 218 may be located in data processing system 200 and a second set of components of risk and constraint manager 218 may be located in another data processing system coupled to data processing system 200.

In this example, risk and constraint manager 218 includes operational space mapper 220, risk and constraint discoverer 222, risk and constraint to actuation event mapper 224, user context sensing engine 226, user protection actuation engine 228, semi-supervised learning module 230, and user trajectory predictor 232. However, it should be noted that risk and constraint manager 218 may include more or fewer components than shown. For example, different illustrative embodiments may split a component into two or more components, combine two or more components into one component, remove components, or add components not shown.

Risk and constraint manager 218 utilizes operational space mapper 220 to generate three-dimensional (3D) map 236 of the operational space corresponding to the user wearing the risk prediction and reduction cognitive suit. Operational space mapper 220 may utilize, for example, 3D reconstruction unit 234 to analyze captured images of the operational space. 3D reconstruction unit 234 may receive the captured images from an imaging system, such as imaging system 116 in FIG. 1, which is located in the operational space. Operational space mapper 220 uses the 3D reconstruction of the operational space produced by 3D reconstruction unit 234 to generate 3D map 236 for identifying risks and constraints within the operational space. The risks and constraints may be, for example, risks 106 and constraints 108 in FIG. 1. Operational space mapper passes to 3D map 236 to risk and constraint discoverer 222.

Risk and constraint discoverer 222 identifies risks and constraints within the operational space. Risk and constraint discoverer 222 utilizes virtual reality (VR) scene creator 238, virtual reality scene segmenter 240, virtual reality scene labeler 242, and label propagator 244 for risk and constraint identification.

Virtual reality scene creator 238 generates a set of one or more virtual reality scenes of the operation space from 3D map 236. Virtual reality scene segmenter 240 segments each virtual reality scene using a 3D segmentation process. Virtual reality scene segmentation helps users identify a particular scene within the operational space and label risks and constraints within that particular scene. Users may utilize a virtual reality interface to label risks and/or constraints within particular virtual reality scene segments. For example, if a particular virtual reality scene segment contains any risk of potential physical injury to a risk prediction and reduction cognitive suit user, then one or more users may label that particular virtual reality scene segment as a risk, such as labeled risk 246. If a particular virtual reality scene contains a narrow or constricted area that restricts user movement, then one or more users may label that particular virtual reality scene segment as a constraint, such as labeled constraint 248. Because user labeling may introduce user subjectivity, virtual reality scene labeler 242 may accumulate user-provided labels for a particular virtual reality scene segment and use the accumulated labels as votes to determine a final resultant "label-class" to which that particular virtual reality scene segment belongs. Virtual reality scene labeler 242 may utilize, for example, a threshold number of accumulated label votes to determine the final resultant label-class. Virtual reality scene labeler 242 maps the accumulated label votes to each particular virtual reality scene segment and stores the mapping for future label propagation purposes.

Label propagator 244 extracts a set of one or more image or visual features from each virtual reality scene segment and matches the extracted features to already labeled virtual reality scene segments. If a high degree of matching exists (e.g., above a defined threshold level of matching) between visual features of a new virtual reality scene segment and an already labeled virtual reality scene segment, then label propagator 244 may propagate the label of the already labeled virtual reality scene segment to the new visually similar virtual reality scene segment. In addition, label propagator 244 may display the propagated label for the new virtual reality scene segment to a user and request user feedback as to whether the propagated label is correct or not. Then, label propagator 244 feeds the user feedback into semi-supervised learning module 230 to improve label generation and propagation accuracy.

Risk and constraint to actuation event mapper 224 maps labeled risks and constraints, such as labeled risk 246 and labeled constraint 248, to one or more corresponding user protection actuation events, such as actuation event 250. This mapping process may require seed mapping input from a set of one or more users. Actuation event 250 represents a specific cognitive suit counter-measure corresponding to a particular labeled risk or constraint that is proximate to the user of the risk prediction and reduction cognitive suit in the operational space. After receiving the seed mapping provided by the set of users, risk and constraint to actuation event mapper 224 is capable of automatically mapping labeled risks and constraints within the operational space to risk prediction and reduction cognitive suit actuation events based on the historic labeling of risks and constraints.

User context sensing engine 226 detects a context of the risk prediction and reduction cognitive suit user based on sensor data 252, which is received from the set of sensors embedded in the risk prediction and reduction cognitive suit. The set of sensors may include, for example, localization sensors and proximity sensors. The localization sensors may be, for example, global positioning system (GPS) transceivers or position beacon transmitters to track movements of the risk prediction and reduction cognitive suit user as the user moves throughout the operational space. The location sensors generate geolocation data 254, which identify a current real-time geographic location of the risk prediction and reduction cognitive suit user within the operational space. User context sensing engine 226 utilizes the proximity sensors to detect distances from the user's body parts, such as head, arms, hands, fingers, legs, feet, toes, and the like, to surrounding objects within the operational space, such as walls, machinery, furnaces, and the like. The proximity sensors generate proximity data 256, which identify current real-time distances to objects proximate to the risk prediction and reduction cognitive suit user.

User protection actuation engine 228 activates a set of one or more actuators embedded in the risk prediction and reduction cognitive suit to protect the risk prediction and reduction cognitive suit user from risks and constraints located within the operational space. The set of actuators may include, for example, one or more inflatable surface apparatus. User protection actuation engine 228 uses the set of actuators to regulate or control the level or degree of inflation and deflation of the inflatable surface apparatus, which cushion contact between the risk prediction and reduction cognitive suit user and hot surfaces and sharp edges, for example. These inflatable surface apparatus may be embedded on the outer surface of the risk prediction and reduction cognitive suit. In addition, these inflatable surface apparatus also may be layered with thermal protection material, such as asbestos, to increase protection from hot surfaces or molten materials, for example.

Risk and constraint manager 218 utilizes user context sensing engine 226 and user protection actuation engine 228 to address four possible scenarios and their corresponding mitigation strategy (i.e., actuation event). A first mitigation strategy may be a risk warning event when both a labeled risk and a labeled constraint exist within the operational space proximate to the risk prediction and reduction cognitive suit user. User context sensing engine 226 issues a risk warning when a labeled risk is proximate (e.g., within a predefined distance) to the risk prediction and reduction cognitive suit user and user protection actuation engine 228 cannot execute a corresponding mitigation action. For example, based on a predicted trajectory of the risk prediction and reduction cognitive suit user in the operational space, user context sensing engine 226 determines that the risk prediction and reduction cognitive suit user will soon be entering a narrow passageway with sharp edges, which is labeled both as a risk and a constraint. However, deployment of protective inflatable surfaces embedded in the risk prediction and reduction cognitive suit prevents movement of the user within the narrow passageway. As a result, user protection actuation engine 228 does not deploy the protective inflatable surfaces because the deployment may result in injury to the user within the narrow passageway. Thus, risk and constraint manger 218 only issues a risk warning to the risk prediction and reduction cognitive suit user in this example situation.

A second mitigation strategy may be a risk protection event when a labeled risk exists within the operational space proximate to the user, but not a labeled constraint. Risk protection involves user protection actuation engine 228 deploying a set of one or more risk counter-measures, such as inflation of the inflatable surface apparatus, to protect the risk prediction and reduction cognitive suit user from a proximate labeled risk within the operational space. User protection actuation engine 228 determines the appropriate set of counter-measures to deploy based on the mapping between cognitive suit actuation events and labeled risks and constraints generated by risk and constraint to actuation event mapper 224.

A third mitigation strategy may be a constraint relaxation event when a labeled constraint exists within the operational space proximate to the user, but not a labeled risk. For example, if user protection actuation engine 228 previously deployed a set of counter-measures corresponding to a labeled risk, but the risk prediction and reduction cognitive suit user is no longer proximate to the labeled risk and the user's current trajectory indicates that the user will soon be entering an area labeled as a constraint within the operational space, then user protection actuation engine 228 may relax, decrease, or lessen the counter-measure commensurate with the size of the constraint. A fourth mitigation strategy may be a no action event when neither a labeled risk nor a labeled constraint exists within the operational space proximate to the risk prediction and reduction cognitive suit user.

Risk and constraint manager 218 utilizes semi-supervised learning module 230 to analyze and learn from user input 258 and user feedback 260. User input 258 represents user labeling of risks and constraints within the operational space. User feedback 260 represents accuracy of labels and effectiveness of deployed actuation events. Semi-supervised learning module 230 infers labels for unlabeled risks and constraints using the set of labeled training data (i.e., user input 258) and modifies actuation events based on user feedback 260.

Risk and constraint manager 218 utilizes user trajectory predictor 232 to predict the current trajectory of the risk prediction and reduction cognitive suit user within the operational space. For example, as the risk prediction and reduction cognitive suit user moves within the operational space, user trajectory predictor 232 predicts the user's trajectory using, for example, Long Short-Term Memory (LSTM) methods and uses the predicted trajectory to anticipate the user encountering labeled risks and/or constraints within the operational space. Depending on the distance to labeled risks and constraints along the user's predicted trajectory, user protection actuation engine 228 may execute one or more actuation events to mitigate a proximate risk and/or constraint.

As an example use case scenario, a factory worker needs to navigate through an iron-ore processing factory containing hot furnaces, shrapnel laden floors, sharp-edged machinery, narrow passageways, and the like. Risk and constraint manager 218 adapts to conditions within the operational space of the risk prediction and reduction cognitive suit user. For example, if the user is walking through a broad hallway that does not include any labeled risks, then risk and constraint manager 218 keeps the risk prediction and reduction cognitive suit in a deflated condition. However, as the risk prediction and reduction cognitive suit user approaches a sharp-edged passageway labeled as a risk, risk and constraint manager 218 inflates the risk prediction and reduction cognitive suit commensurate to the width of the sharp-edged passageway and the comfort level of the user in order to protect the user from the sharp edges in the passageway. In another example use case scenario where the factory floor has shrapnel or molten waste from a blast furnace in proximity to the risk prediction and reduction cognitive suit user, risk and constraint manager 218 may only inflate a shoe portion of the risk prediction and reduction cognitive suit deploying an outer thermal protection layer and air cushion to protect the user's feet.

Communications unit 210, in this example, provides for communication with other computers, data processing systems, and devices via a network. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 262 is located in a functional form on computer readable media 264 that is selectively removable and may be loaded onto or transferred to data processing system 200 for running by processor unit 204. Program code 262 and computer readable media 264 form computer program product 266. In one example, computer readable media 264 may be computer readable storage media 268 or computer readable signal media 270. Computer readable storage media 268 may include, for example, an optical or magnetic disc that is inserted or placed into a drive or other device that is part of persistent storage 208 for transfer onto a storage device, such as a hard drive, that is part of persistent storage 208. Computer readable storage media 268 also may take the form of a persistent storage, such as a hard drive, a thumb drive, or a flash memory that is connected to data processing system 200. In some instances, computer readable storage media 268 may not be removable from data processing system 200.

Alternatively, program code 262 may be transferred to data processing system 200 using computer readable signal media 270. Computer readable signal media 270 may be, for example, a propagated data signal containing program code 262. For example, computer readable signal media 270 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 262 may be downloaded over a network to persistent storage 208 from another device or data processing system through computer readable signal media 270 for use within data processing system 200. For instance, program code stored in a computer readable storage media in a data processing system may be downloaded over a network from the data processing system to data processing system 200. The data processing system providing program code 262 may be a server computer, a client computer, or some other device capable of storing and transmitting program code 262.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 268 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference now to FIG. 3, a diagram illustrating an example of risk and constraint manager component interaction is depicted in accordance with an illustrative embodiment. Component interaction 300 illustrates the interaction between operational space mapper 304, risk and constraint discoverer 306, risk and constraint to actuation event mapper 308, user context sensing engine 310, user protection actuation engine 312, and data store 314 in risk and constraint manager 302. Operational space mapper 304, risk and constraint discoverer 306, risk and constraint to actuation event mapper 308, user context sensing engine 310, and user protection actuation engine 312 in risk and constraint manager 302 may be, for example, operational space mapper 220, risk and constraint discoverer 222, risk and constraint to actuation event mapper 224, user context sensing engine 226, and user protection actuation engine 228 in risk and constraint manager 218 in FIG. 2.

Operational space mapper 304 generates a risk and constraint labeled 3D context map of an operational space, such as operational space 100 in FIG. 1, corresponding to a user of a risk prediction and reduction cognitive suit. After generating the 3D map, operational space mapper 304 sends the 3D map to risk and constraint discoverer 306 at 316. Risk and constraint discoverer 306 utilizes user input at 318 and semi-supervised learning to label risks and constraints located within the operational space. Risk and constraint discoverer 306 stores the user provided label input in data store 314 for future reference.

Risk and constraint discoverer 306 sends the labeled risks and constraints to risk and constraint to actuation event mapper 308 at 320. Risk and constraint to actuation event mapper 308 associates the labeled risks and constraints to corresponding actuation events to generate a risk and constraint to actuation event mapping and stores the mapping in data store 314 at 322. User context sensing engine 310 retrieves the risk and constraint to actuation event mapping from data store 314 at 324. User context sensing engine 310 utilizes the risk and constraint to actuation event mapping to determine the appropriate actuation event to deploy in response to sensing that the risk prediction and reduction cognitive suit user is proximate to a labeled risk and/or labeled constraint.

User context sensing engine 310 sends the appropriate actuation event based on the mapping to user protection actuation engine 312 at 326. User protection actuation engine 312 actuates the appropriate actuation event to protect the risk prediction and reduction cognitive suit user from the proximate labeled risk and/or labeled constraint. In addition, user protection actuation engine 312 receives user feedback regarding the deployment of the actuation event. User protection actuation engine 312 stores the user feedback in data store 314 for future reference at 328.

Figure 4A:
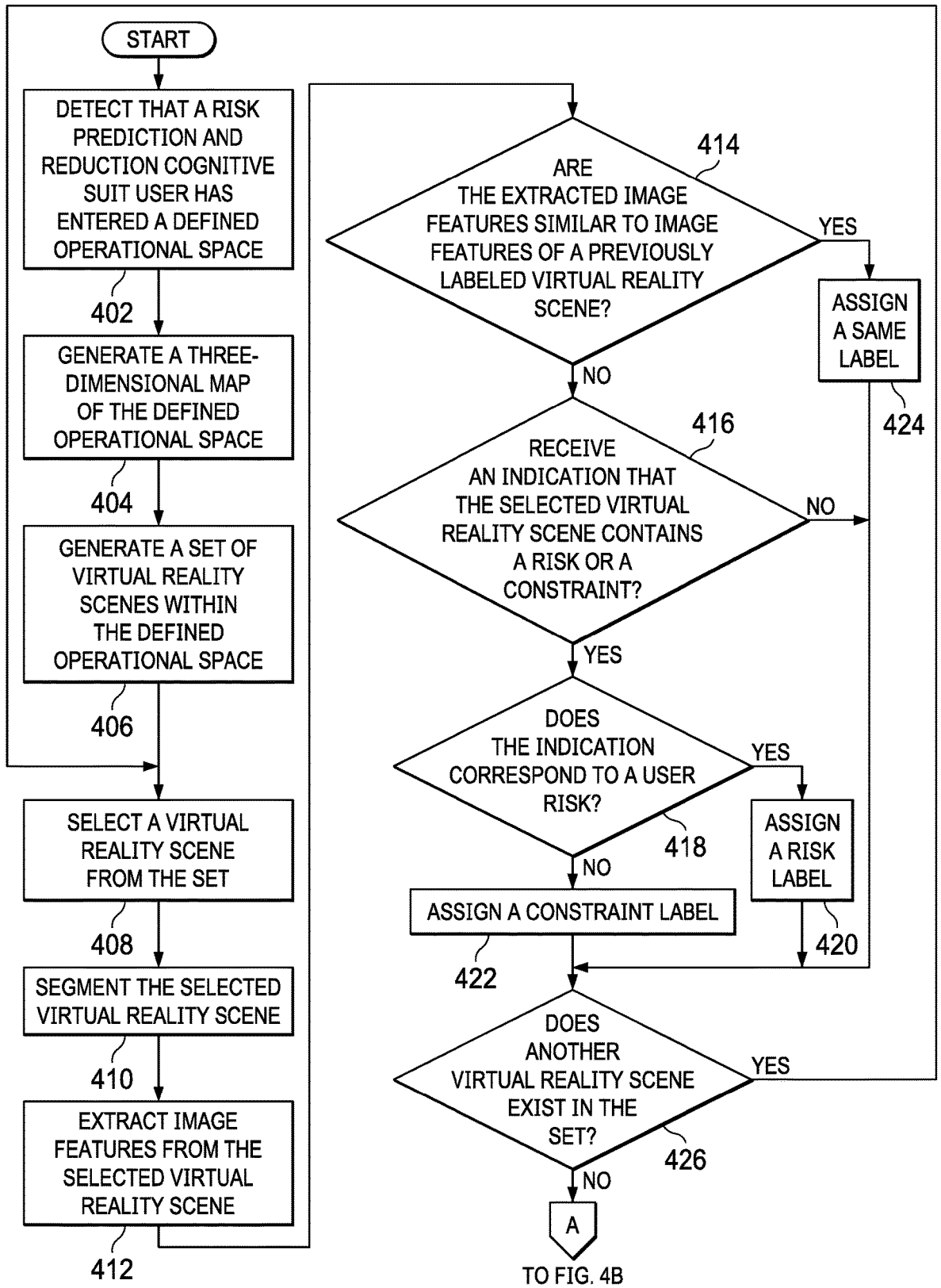
FIGS. 4A-4B are a flowchart illustrating a process for generating a risk and constraint labeled context map of an operational space in accordance with an illustrative embodiment.
Figure 4B:
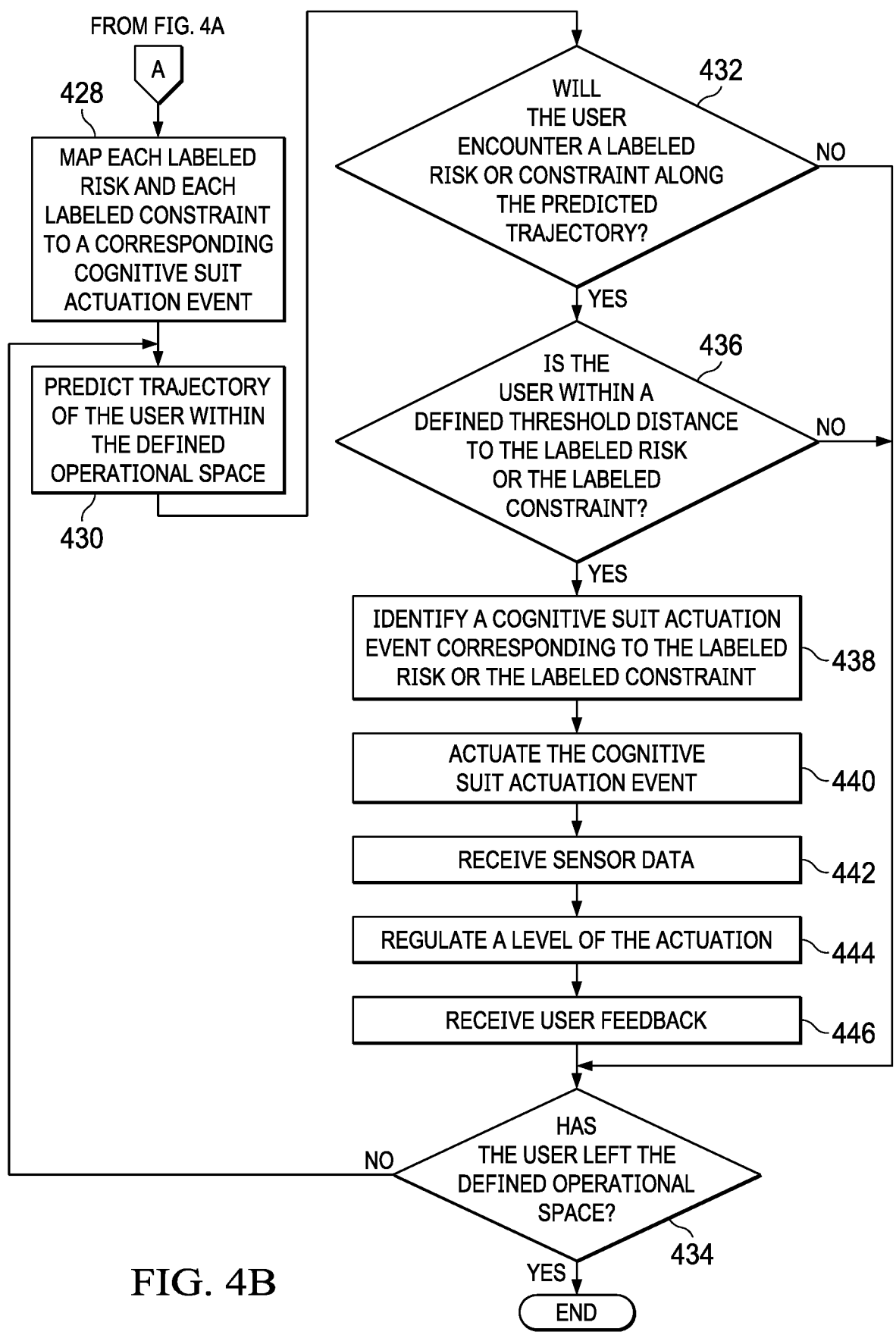

With reference now to FIGS. 4A-4B, a flowchart illustrating a process for generating a risk and constraint labeled context map of an operational space is shown in accordance with an illustrative embodiment. The process shown in FIGS. 4A-4B may be implemented in a data processing system, such as, for example, data processing system 114 in FIG. 1 or data processing system 200 in FIG. 2.

The process begins when the data processing system detects that a user of a risk prediction and reduction cognitive suit has entered a defined operational space corresponding to the user (step 402). It should be noted that the data processing system is embedded in the risk prediction and reduction cognitive suit. Afterward, the data processing system generates a three-dimensional map of the defined operational space using captured images of the defined operational space by an imaging system coupled to the data processing system (step 404). The imaging system may be, for example, a set of cameras located within the defined operational space. In addition, the imaging system may be wirelessly coupled to the data processing system, for example.

Further, the data processing system generates a set of one or more virtual reality scenes within the defined operational space based on the three-dimensional map (step 406). Furthermore, the data processing system selects a virtual reality scene from the set of virtual reality scenes (step 408). Moreover, the data processing system segments the selected virtual reality scene using a three-dimension segmentation process (step 410). The data processing system also extracts image features from the selected virtual reality scene (step 412).

Afterward, the data processing system makes a determination as to whether the extracted image features are similar to image features of a previously labeled virtual reality scene (step 414). If the data processing system determines that the extracted image features are not similar to image features of a previously labeled virtual reality scene, no output of step 414, then the data processing system makes a determination as to whether the data processing system received an indication that the selected virtual reality scene contains a risk or a constraint to the user (step 416). If the data processing system determines that the data processing system did not receive an indication that the selected virtual reality scene contains a risk or a constraint to the user, no output of step 416, then the process proceeds to step 426.

If the data processing system determines that the data processing system did receive an indication that the selected virtual reality scene contains a risk or a constraint to the user, yes output of step 416, then the data processing system makes a determination as to whether the indication corresponds to a user risk (step 418). If the data processing system determines that the indication does correspond to a user risk, yes out of step 418, then the data processing system assigns a risk label to the selected virtual reality scene (step 420). Thereafter, the process proceeds to step 426. If the data processing system determines that the indication does not correspond to a user risk, no out of step 418, then the data processing system assigns a constraint label to the selected virtual reality scene (step 422). Thereafter, the process proceeds to step 426.

Returning again to step 414, if the data processing system determines that the extracted image features are similar to image features of a previously labeled virtual reality scene, yes output of step 414, then the data processing system assigns a same label corresponding to the previously labeled virtual reality scene to the selected virtual reality scene (step 424). Subsequently, the data processing system makes a determination as to whether another virtual reality scene exists in the set of virtual reality scenes (step 426). If the data processing determines that another virtual reality scene does exist in the set of virtual reality scenes, yes output of step 426, then the process returns to step 408 where the data processing system selects another virtual reality scene from the set. If the data processing determines that another virtual reality scene does not exist in the set of virtual reality scenes, no output of step 426, then the data processing system maps each labeled risk and each labeled constraint within the defined operational space to a corresponding cognitive suit actuation event (step 428).

Further, the data processing system predicts a trajectory of the user of the risk prediction and reduction cognitive suit within the defined operational space based on historical trajectory information and geolocation data (step 430). Further, the data processing system makes a determination as to whether the user of the risk prediction and reduction cognitive suit will encounter a labeled risk or a labeled constraint within the defined operational space along the predicted trajectory of the user (step 432). If the data processing system determines that the user of the risk prediction and reduction cognitive suit will not encounter a labeled risk or a labeled constraint within the defined operational space along the predicted trajectory of the user, no output of step 432, then the data processing system makes a determination as to whether the user left the defined operational space (step 434).

If the data processing system determines that the user has left the defined operational space, yes output of step 434, then the process terminates thereafter. If the data processing system determines that the user has not left the defined operational space, no output of step 434, then the process returns to step 430 where the data processing system continues to predict the user's trajectory.

Returning again to step 432, if the data processing system determines that the user of the risk prediction and reduction cognitive suit will encounter a labeled risk or a labeled constraint within the defined operational space along the predicted trajectory of the user, yes output of step 432, then the data processing system makes a determination as to whether the user is within a defined threshold distance to the labeled risk or the labeled constraint (step 436). If the data processing system determines that the user is not within the defined threshold distance to the labeled risk or the labeled constraint, no output of step 436, then the process returns to step 434 where the data processing system determines whether the user has left the defined operational space. If the data processing system determines that the user is within the defined threshold distance to the labeled risk or the labeled constraint, yes output of step 436, then the data processing system identifies a cognitive suit actuation event that corresponds to the labeled risk or the labeled constraint within the defined threshold distance based on the mapping (step 438).

Afterward, the data processing system actuates the cognitive suit actuation event that corresponds to the labeled risk or the labeled constraint within the defined threshold distance (step 440). Subsequently, the data processing system receives sensor data from a set of sensors embedded in the risk prediction and reduction cognitive suit (step 442). Then, the data processing system regulates a level of actuation of the cognitive suit actuation event based on the received sensor data (step 444). In addition, the data processing system receives feedback from the user of risk prediction and reduction cognitive suit regarding the level of actuation of the risk prediction and reduction cognitive suit (step 446). Thereafter, the process returns to step 434 where the data processing system determines whether the user has left the defined operational space.

Figure 5:
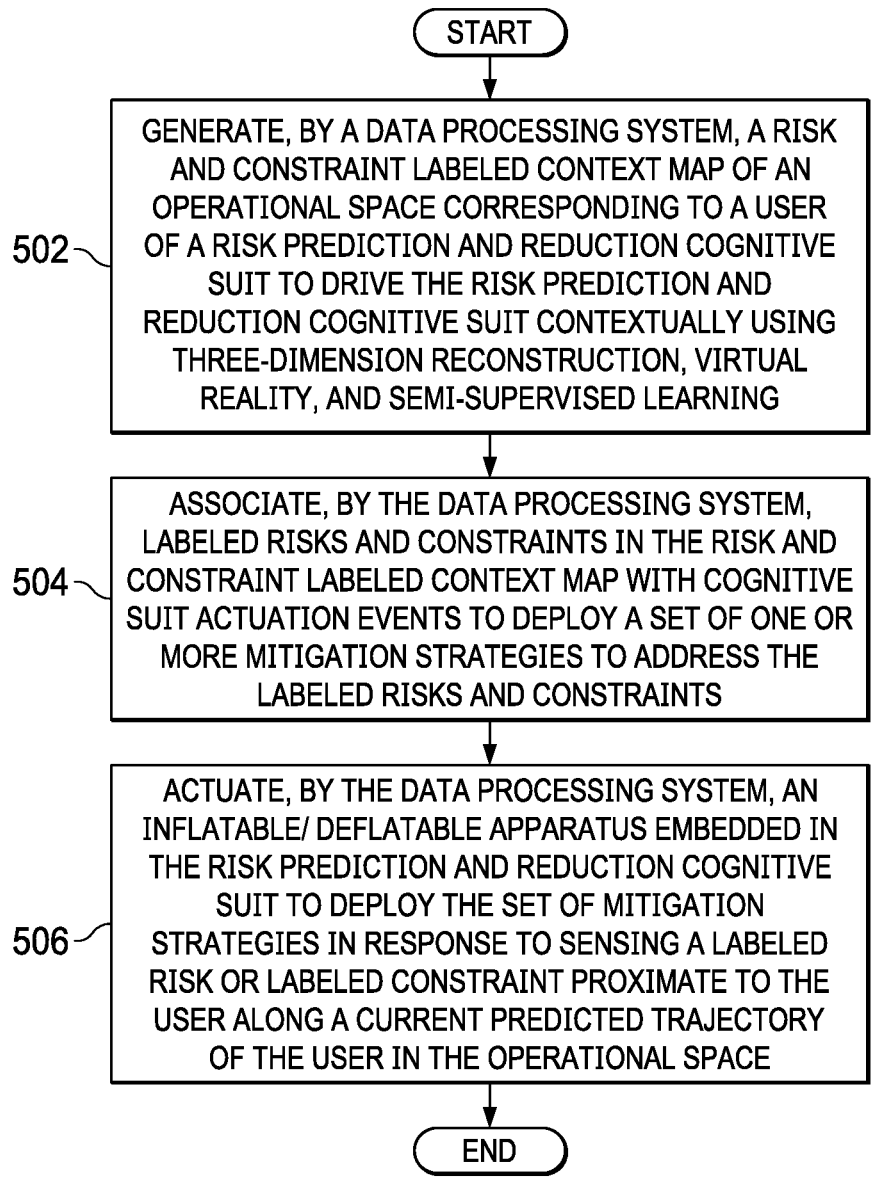
FIG. 5 is a flowchart illustrating a process for actuating a user protective mechanism in a risk prediction and reduction cognitive suit in accordance with an illustrative embodiment.

With reference now to FIG. 5, a flowchart illustrating a process for actuating a user protective mechanism in a risk prediction and reduction cognitive suit is shown in accordance with an illustrative embodiment. The process shown in FIG. 5 may be implemented in a data processing system, such as, for example, data processing system 114 in FIG. 1 or data processing system 200 in FIG. 2.

The process begins when the data processing system generates a risk and constraint labeled context map of an operational space corresponding to a user of a risk prediction and reduction cognitive suit to drive the risk prediction and reduction cognitive suit contextually using three-dimension reconstruction, virtual reality, and semi-supervised learning (step 502). In addition, the data processing system associates labeled risks and constraints in the risk and constraint labeled context map with cognitive suit actuation events to deploy a set of one or more mitigation strategies to address the labeled risks and constraints (step 504). Further, the data processing system actuates an inflatable/deflatable apparatus embedded in the risk prediction and reduction cognitive suit to deploy the set of mitigation strategies in response to sensing a labeled risk or labeled constraint proximate to the user along a current predicted trajectory of the user in the operational space (step 506). Thereafter, the process terminates.

Thus, illustrative embodiments of the present invention provide a computer-implemented method, computer system, and computer program product for generating a risk and constraint labeled context map of an operational space corresponding to a user of a risk prediction and reduction cognitive suit to drive an inflate/deflate actuation apparatus embedded in the risk prediction and reduction cognitive suit contextually using three-dimension reconstruction of the operational space, virtual reality, and semi-supervised learning. This means that illustrative embodiments are capable of actuating the risk prediction and reduction cognitive suit proactively to prepare the risk prediction and reduction cognitive suit for the safety of its user before the user encounters a risk or constraint along a predicted trajectory of the user. As a result, illustrative embodiments predict and anticipate risks and constraints to the user within the operational space beyond the range of embedded cognitive suit sensors. In other words, the embedded sensors within the cognitive suit alone are not capable of predicting risks or constraints within the operational space prior to the embedded sensors actually detecting a risk or constraint.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a risk and constraint labeled context map of an operational space, the computer-implemented method comprising:

generating, by a data processing system, the risk and constraint labeled context map of the operational space corresponding to a user of a cognitive suit to drive the cognitive suit contextually using three-dimension reconstruction, virtual reality, and semi-supervised learning;

associating, by the data processing system, labeled risks and constraints in the risk and constraint labeled context map with cognitive suit actuation events to deploy a set of mitigation strategies to address the labeled risks and constraints;

actuating, by the data processing system, an apparatus embedded in the cognitive suit to deploy the set of mitigation strategies in response to sensing a labeled risk or labeled constraint proximate to the user along a trajectory of the user in the operational space; and mapping, by the data processing system, each labeled risk and each labeled constraint within the risk and constraint labeled context map of the operational space to a corresponding cognitive suit actuation event.

2. The computer-implemented method of claim 1 further comprising:

detecting, by the data processing system, that the user of the cognitive suit has entered the operational space corresponding to the user; and generating, by the data processing system, a three-dimensional map of the operational space using captured images of the operational space by an imaging system coupled to the data processing system.

3. The computer-implemented method of claim 2 further comprising:

generating, by the data processing system, a set of virtual reality scenes within the operational space based on the three-dimensional map;

selecting, by the data processing system, a virtual reality scene from the set of virtual reality scenes; and segmenting, by the data processing system, the selected virtual reality scene using a three-dimension segmentation process.

4. The computer-implemented method of claim 3 further comprising:

extracting, by the data processing system, image features from the selected virtual reality scene;

determining, by the data processing system, whether the extracted image features are similar to image features of a previously labeled virtual reality scene; and responsive to the data processing system determining that the extracted image features are similar to image features of a previously labeled virtual reality scene, assigning, by the data processing system, a same label corresponding to the previously labeled virtual reality scene to the selected virtual reality scene.

5. The computer-implemented method of claim 4 further comprising:

responsive to the data processing system determining that the extracted image features are not similar to image features of a previously labeled virtual reality scene, determining, by the data processing system, whether the data processing system received an indication that the selected virtual reality scene contains a risk or a constraint to the user;

responsive to the data processing system determining that the data processing system did receive an indication that the selected virtual reality scene contains a risk or a constraint to the user, determining, by the data processing system, whether the indication corresponds to a user risk;

responsive to the data processing system determining that the indication does correspond to a user risk, assigning, by the data processing system, a risk label to the selected virtual reality scene; and responsive to the data processing system determining that the indication does not correspond to a user risk, assigning, by the data processing system, a constraint label to the selected virtual reality scene.

6. The computer-implemented method of claim 1 further comprising:

predicting, by the data processing system, a current trajectory of the user of the cognitive suit within the operational space based on historical trajectory information and geolocation data.

7. The computer-implemented method of claim 1 further comprising:

responsive to the data processing system determining that the user of the cognitive suit will encounter a labeled risk or a labeled constraint within the operational space along a predicted trajectory of the user, determining, by the data processing system, whether the user is within a defined threshold distance to the labeled risk or the labeled constraint;

responsive to the data processing system determining that the user is within the defined threshold distance to the labeled risk or the labeled constraint, identifying, by the data processing system, a cognitive suit actuation event that corresponds to the labeled risk or the labeled constraint within the defined threshold distance based on a mapping of labeled risks and constraints to corresponding cognitive suit actuation events; and actuating, by the data processing system, the cognitive suit actuation event that corresponds to the labeled risk or the labeled constraint within the defined threshold distance.

8. The computer-implemented method of claim 7 further comprising:

receiving, by the data processing system, sensor data from a set of sensors embedded in the cognitive suit; and regulating, by the data processing system, a level of actuation of the cognitive suit actuation event based on the received sensor data.

9. The computer-implemented method of claim 8, wherein the set of sensors include a geographical position sensor and an object proximity detector.

10. The computer-implemented method of claim 8 further comprising:
receiving, by the data processing system, feedback from the user of the cognitive suit regarding the level of actuation of the cognitive suit.

11. The computer-implemented method of claim 1, wherein the cognitive suit is a risk prediction and reduction cognitive suit.

12. The computer-implemented method of claim 11, wherein the data processing system is embedded in the risk prediction and reduction cognitive suit.

13. The computer-implemented method of claim 1, wherein the apparatus is an inflatable/deflatable apparatus.

14. The computer-implemented method of claim 1, wherein the set of mitigation strategies includes a risk warning event when a labeled risk and a labeled constraint exist within the operational space proximate to the user of the cognitive suit, a risk protection event when a labeled risk exists within the operational space proximate to the user and not a labeled constraint, a constraint relaxation event when a labeled constraint exists within the operational space proximate to the user and not a labeled risk, and a no action event when neither a labeled risk nor a labeled constraint exists within the operational space proximate to the user.

15. A data processing system for generating a risk and constraint labeled context map of an operational space, the data processing system comprising:
a bus system;
a storage device connected to the bus system, wherein the storage device stores program instructions; and
a processor connected to the bus system, wherein the processor executes the program instructions to:
generate the risk and constraint labeled context map of the operational space corresponding to a user of a cognitive suit to drive the cognitive suit contextually using three-dimension reconstruction, virtual reality, and semi-supervised learning;
associate labeled risks and constraints in the risk and constraint labeled context map with cognitive suit actuation events to deploy a set of mitigation strategies to address the labeled risks and constraints; and
actuate an apparatus embedded in the cognitive suit to deploy the set of mitigation strategies in response to sensing a labeled risk or labeled constraint proximate to the user along a trajectory of the user in the operational space.

16. A computer program product for generating a risk and constraint labeled context map of an operational space, the computer program product comprising a computer readable storage medium having program instructions embodied therewith, the program instructions executable by a data processing system to cause the data processing system to perform a method comprising:
generating, by the data processing system, the risk and constraint labeled context map of the operational space corresponding to a user of a cognitive suit to drive the cognitive suit contextually using three-dimension reconstruction, virtual reality, and semi-supervised learning;
associating, by the data processing system, labeled risks and constraints in the risk and constraint labeled context map with cognitive suit actuation events to deploy a set of mitigation strategies to address the labeled risks and constraints; and
actuating, by the data processing system, an apparatus embedded in the cognitive suit to deploy the set of mitigation strategies in response to sensing a labeled risk or labeled constraint proximate to the user along a trajectory of the user in the operational space.

17. The computer program product of claim 16 further comprising:
detecting, by the data processing system, that the user of the cognitive suit has entered the operational space corresponding to the user; and
generating, by the data processing system, a three-dimensional map of the operational space using captured images of the operational space by an imaging system coupled to the data processing system.

18. The computer program product of claim 17 further comprising:
generating, by the data processing system, a set of virtual reality scenes within the operational space based on the three-dimensional map;
selecting, by the data processing system, a virtual reality scene from the set of virtual reality scenes; and
segmenting, by the data processing system, the selected virtual reality scene using a three-dimension segmentation process.

19. The computer program product of claim 18 further comprising:
extracting, by the data processing system, image features from the selected virtual reality scene;
determining, by the data processing system, whether the extracted image features are similar to image features of a previously labeled virtual reality scene; and
responsive to the data processing system determining that the extracted image features are similar to image features of a previously labeled virtual reality scene, assigning, by the data processing system, a same label corresponding to the previously labeled virtual reality scene to the selected virtual reality scene.

* * * * *